(12) United States Patent
Shan

(10) Patent No.: US 7,658,011 B2
(45) Date of Patent: Feb. 9, 2010

(54) LOPPER

(75) Inventor: Su-Hua Shan, Taipei (TW)

(73) Assignee: Natura Innovation Ltd., Port Louis (MU)

( * ) Notice: Subject to any disclaimer, the term of this patent is extended or adjusted under 35 U.S.C. 154(b) by 402 days.

(21) Appl. No.: 11/890,724

(22) Filed: Aug. 7, 2007

(65) Prior Publication Data

US 2009/0038162 A1    Feb. 12, 2009

(51) Int. Cl.
   *B26B 13/26*    (2006.01)
   *B26B 13/00*    (2006.01)
(52) U.S. Cl. .............................. 30/249; 30/188; 30/255
(58) Field of Classification Search ........... 30/188–190, 30/244–252, 254–261
   See application file for complete search history.

(56) References Cited

U.S. PATENT DOCUMENTS

| 247,128 | A | * | 9/1881 | Stanley | 30/249 |
| 1,246,685 | A | * | 11/1917 | Unruh | 30/249 |
| 1,507,225 | A | * | 9/1924 | Barrett | 30/249 |
| 2,247,723 | A | * | 7/1941 | Chial | 30/228 |
| 4,649,646 | A | * | 3/1987 | Lemcke | 30/231 |
| 5,745,998 | A | * | 5/1998 | Le et al. | 30/249 |
| 5,950,315 | A | * | 9/1999 | Linden | 30/249 |
| 6,178,644 | B1 | * | 1/2001 | Le et al. | 30/249 |
| 6,526,664 | B2 | * | 3/2003 | Cech | 30/249 |
| 6,748,663 | B2 | * | 6/2004 | Linden | 30/249 |

* cited by examiner

*Primary Examiner*—Boyer D. Ashley
*Assistant Examiner*—Edward Landrum
(74) *Attorney, Agent, or Firm*—Charles E. Baxley

(57) ABSTRACT

A lopper includes a slender rod and a pruning means mounted on a top of the rod. The slender rod includes an inner tube and an outer tube telescoped mutually such that the inner tube is shiftable in the outer tube for changing the length it jutting out from the outer tube. An extension-control unit is provided at the border region between the inner tube and the outer tube for positioning the inner tube. A fist actuating unit and a second actuating unit are provided at the outer surface of the outer tube. The fist and second actuating units are connected with the pruning means through a first rope, a second rope and a third rope so that when a user pulls the first or second actuating unit, a shear assembly of the pruning means can be closed to cut branches and leaves of plants.

17 Claims, 15 Drawing Sheets

LOPPER

BACKGROUND OF THE INVENTION

1. Technical Field

The present invention relates to gardening tools, and more particularly, to a lopper for pruning tree branches and leaves lying high.

2. Description of Related Art

A lopper is typically implemented to prune tree branches and leaves lying high, which is composed of a slender rod and a pair of shears mounted on the top of the rod. One general objective of loppers is to facilitate effort-saving operation. To achieve this objective, various mechanisms employing linkages and levers are applied to loppers, such as those disclosed in U.S. Pat. Nos. 6,178,644 and 4,649,646. However, as the conventional lopper has the complexly structured and bulky shears mounted on the top of the rod, it would be difficult for a user to maintain the balance of the lopper while holding and operating the same. Besides, the heavy weight of the shears of the conventional lopper substantially burdens the user. Moreover, the intricate linkages and ropes settled around the shears are liable to get tangled with luxuriant branches and leaves where a user tries to stretch the shears through, therefore resulting in retarded efficiency of pruning.

One solution for the aforementioned conventional loppers has been disclosed in U.S. Pat. No. 5,950,315. It is obvious that the shears of lopper of '315 Patent are more simplified and efficient as compared with those of the aforementioned conventional loppers. Nevertheless, linkage efficiency is not perfectly performed in '315 Patent because the distance between the point where the chain exerts a force on the blade and the pivot point is not long enough for facilitating effort-saving pruning. Therefore, the inventor of the present invention further enhances the keenness of the blades with the attempt to compensate for the short of effort-saving efficiency. Furthermore, as the rod of the '315 lopper has a fixed length which is not extendable, if a user wants to prune branches and leaves at a relatively higher location, a ladder has to be implemented to lift the user and this may disadvantageously render inconvenience and danger to the user.

SUMMARY OF THE INVENTION

The present invention has been accomplished under these circumstances in view. It is one objective of the present invention to provide a lopper that facilitates effort-saving pruning and has a rod with a length, which is adjustable according to the altitude of the branches and leaves to be pruned.

To achieve these and other objectives of the present invention, the lopper comprises a slender rod and a pruning means mounted on a top of the rod. The slender rod is composed of an inner tube and an outer tube telescoped mutually such that the inner tube is shiftable in the outer tube for changing the length as it jutting out from the outer tube. An extension-control unit is provided at the border region between the inner tube and the outer tube for positioning the inner tube. A first actuating unit and a second actuating unit are provided at an outer surface of the outer tube. The first and second actuating units are connected with the pruning means through a first rope, a second rope and a third rope so that when a user pulls the first or second actuating unit, a shear assembly of the pruning means can be closed to cut branches and leaves of plants.

The disclosed lopper has the advantages of effort-saving operation, simplified construction, light weight, easy gripping, easy controlling, and adjustable operational angle of the shear assembly. Additionally, the lopper of the present invention allows a user to adjust the extending length of the handling rod according to the altitude of the branches and leaves to be pruned.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
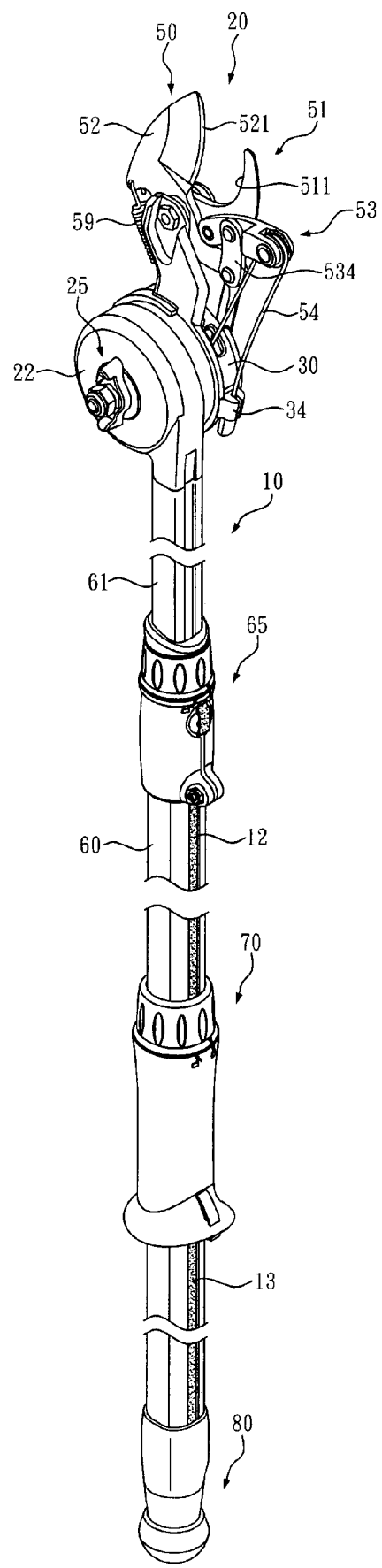
FIG. 1 is a perspective view of the lopper of the present invention.
Figure 2:
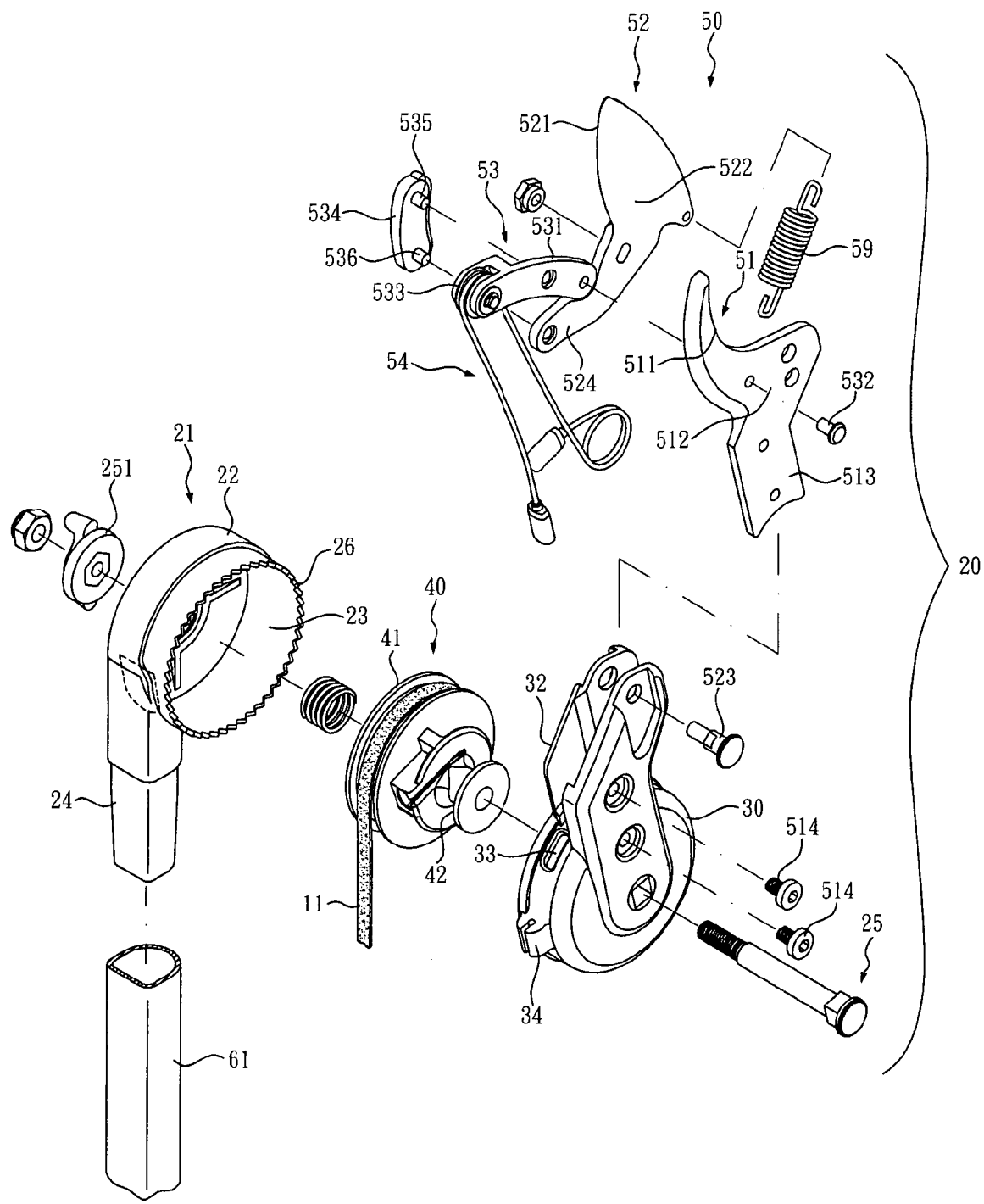
FIG. 2 is an exploded view of the pruning mechanism according to the present invention.
Figure 3:
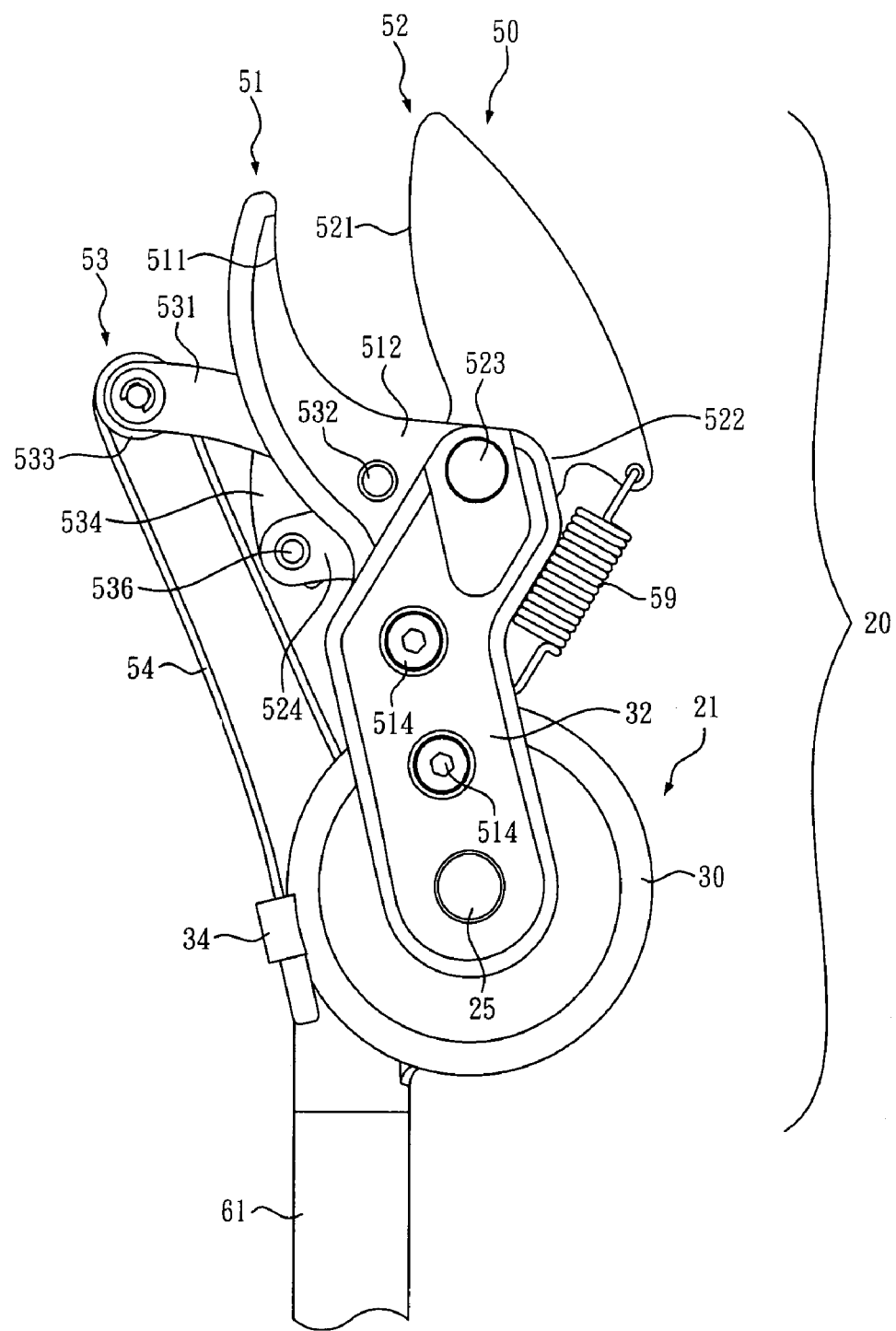
FIG. 3 is a front view of the pruning mechanism according to the present invention.
Figure 4:
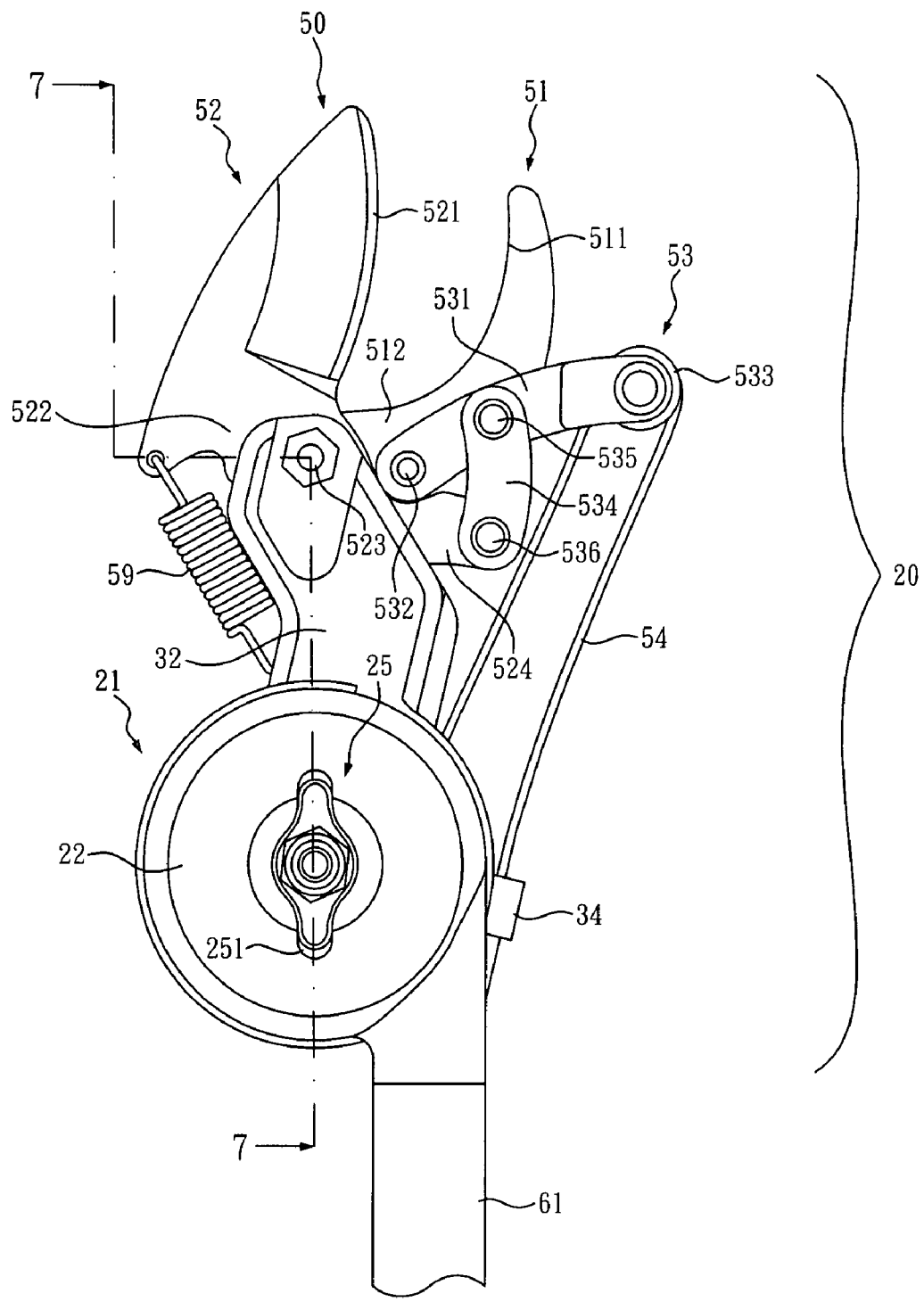
FIG. 4 is a back view of the pruning mechanism according to the present invention.

As shown in FIG. 1, the lopper of the present invention primarily comprises a slender rod 10 and a pruning mechanism 20 mounted on a top of the slender rod 10. The slender rod 10 includes an apparently visible outer tube 60, an inner tube 61 shiftably telescoped inside the outer tube 60, an extension-control unit 65 provided at a border region between the outer and inner tubes 60, 61, a first actuating unit 70 deposited at the outer tube 60 and a second actuating unit 80 deposited at a bottom of the outer tube 60.

The pruning mechanism 20, referring to FIGS. 1 through 5, comprises three parts, which are a drum 21, an axial wheel 40 and a shear assembly 50, wherein the drum 21 is constructed form combining a fixed portion 22 and a rotatable portion 30 face to face.

Figure 7:
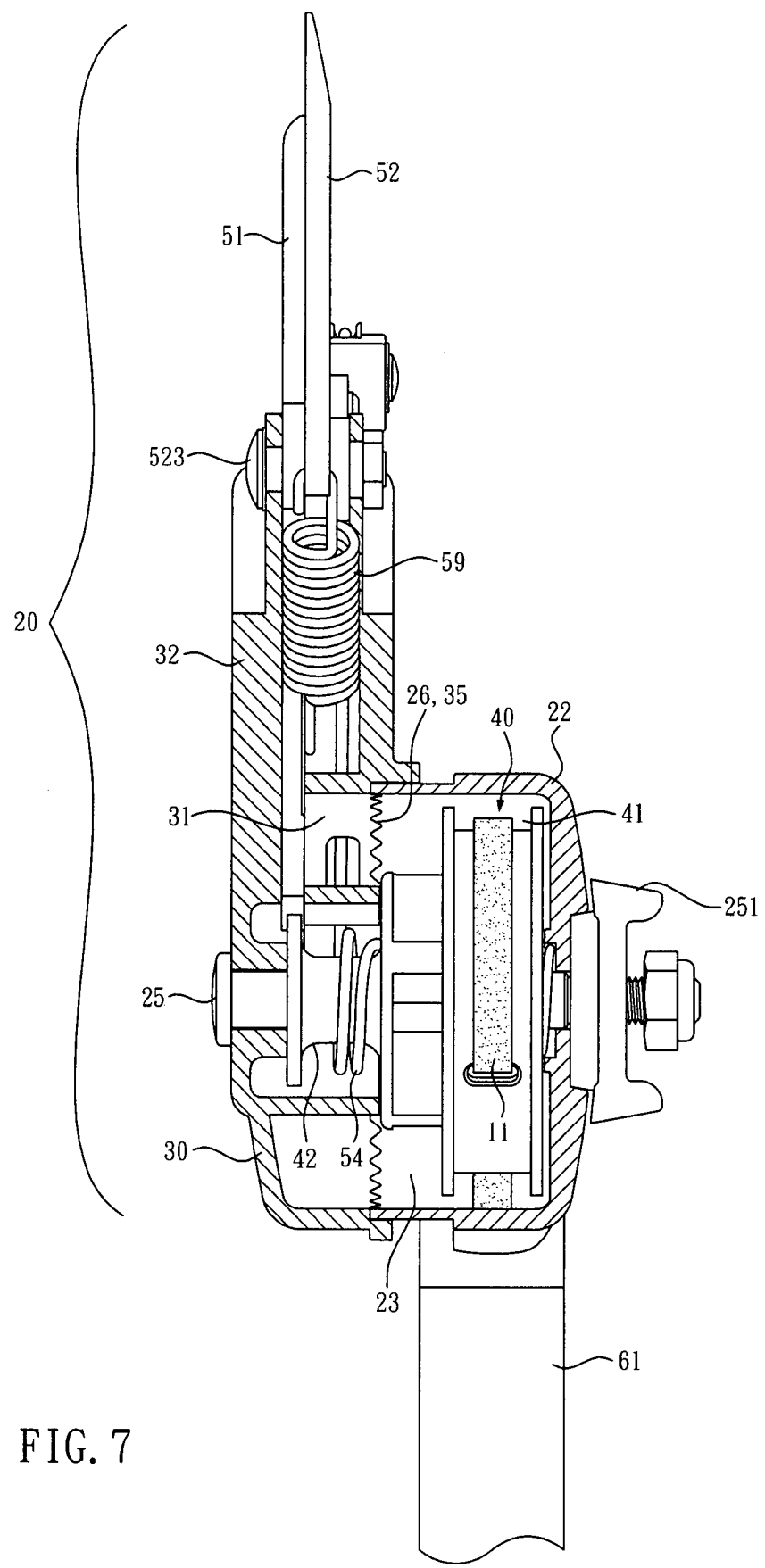
FIG. 7 is a sectional view taken along line 7-7 of FIG. 4.

The fixed portion 22 is substantially shaped as a round box for providing a round space 23 therein. A combining portion 24 radially extends outward from the fixed portion 22 for being inserted into a top of the inner tube 61 of the slender rod 10. The rotatable portion 30 is substantially shaped as a round box for providing a round space 31 therein (as shown in FIG. 7). A combining portion 32 radially extends outward from the rotatable portion 30 for being combined with the shear assembly 50. The fixed portion 22 and the rotatable portion 30 are coaxially combined so that the axial wheel 40 can be accommodated in the round spaces 23, 31. A manual-loosened bolt assembly 25 passes through the fixed portion 22, the rotatable portion 30, a center of the axial wheel 40 to combine the fixed portion 22 and the rotatable portion 30 together such that the axial wheel 40 can rotate about the bolt assembly 25.

The axial wheel 40 includes a first reel 41 and a second reel 42 which are configured coaxially. The first reel 41 has a diameter greater than that of the second reel 42. A first rope 11 has one end thereof fastened to the first reel 41 and is then wound around the first reel 41. Afterward, an opposite end of the first rope 11 goes into the inner tube 61 of the slender rod 10.

The shear assembly 50 comprises a fixed blade 51, a movable blade 52, a linkage 53 and a flexible linking component 54. The fixed blade 51 has an integral structure that includes a block portion 511, a pivot portion 512 and a combining portion 513, wherein the combining portion 513 is fixed to the combining portion 32 of the rotatable portion 30 by means of a fastening component 514. The movable blade 52 has an integral structure that includes a blade portion 521, a pivot portion 522 and a driving portion 524. The movable blade 52 is set in the combining portion 32 of the rotatable portion 30 abutting one side of the fixed blade 51 such that the pivot portion 522 thereof abuts the pivot portion 512 of the fixed blade 51. Afterward, a pin 523 passing through the two pivot portions 512, 522 can be fixed to the combining portion 32 of the rotatable portion 30 so that the movable blade 52 can rotate about the pin 523. The linkage 53 connected with the pivot portion 512 of the fixed blade 51 and the driving portion 524 of the movable blade 52 is a two-piece linkage. A first link 531 of the linkage 53 has one end thereof rotatably fastened to the pivot portion 512 of the fixed blade 51 by a pin 532 and has an opposite end thereof equipped with a pulley 533. A second link 534 of the linkage 53 has one end thereof rotatably fastened to the first link 531 by a pin 535 and has an opposite end thereof rotatably fastened to the driving portion 524 of the movable blade 52 by a pin 536. The flexible linking component 54 wound around the pulley 533 has one end thereof passing through a preformed hole 33 preset on the rotatable portion 30 and is then fixed at the second reel 42 of the axial wheel 40. Then an opposite end of the flexible linking component 54 is fixed at a positioning member 34 outside the rotatable portion 30. A returning spring 59 is provided between the pivot portion 522 of the movable blade 52 and the rotatable portion 30 for exerting a recoiling force on the movable blade 52 so that the blade portion 521 of the movable blade 52 is normally separated from the fixed blade 51.

Figure 5:
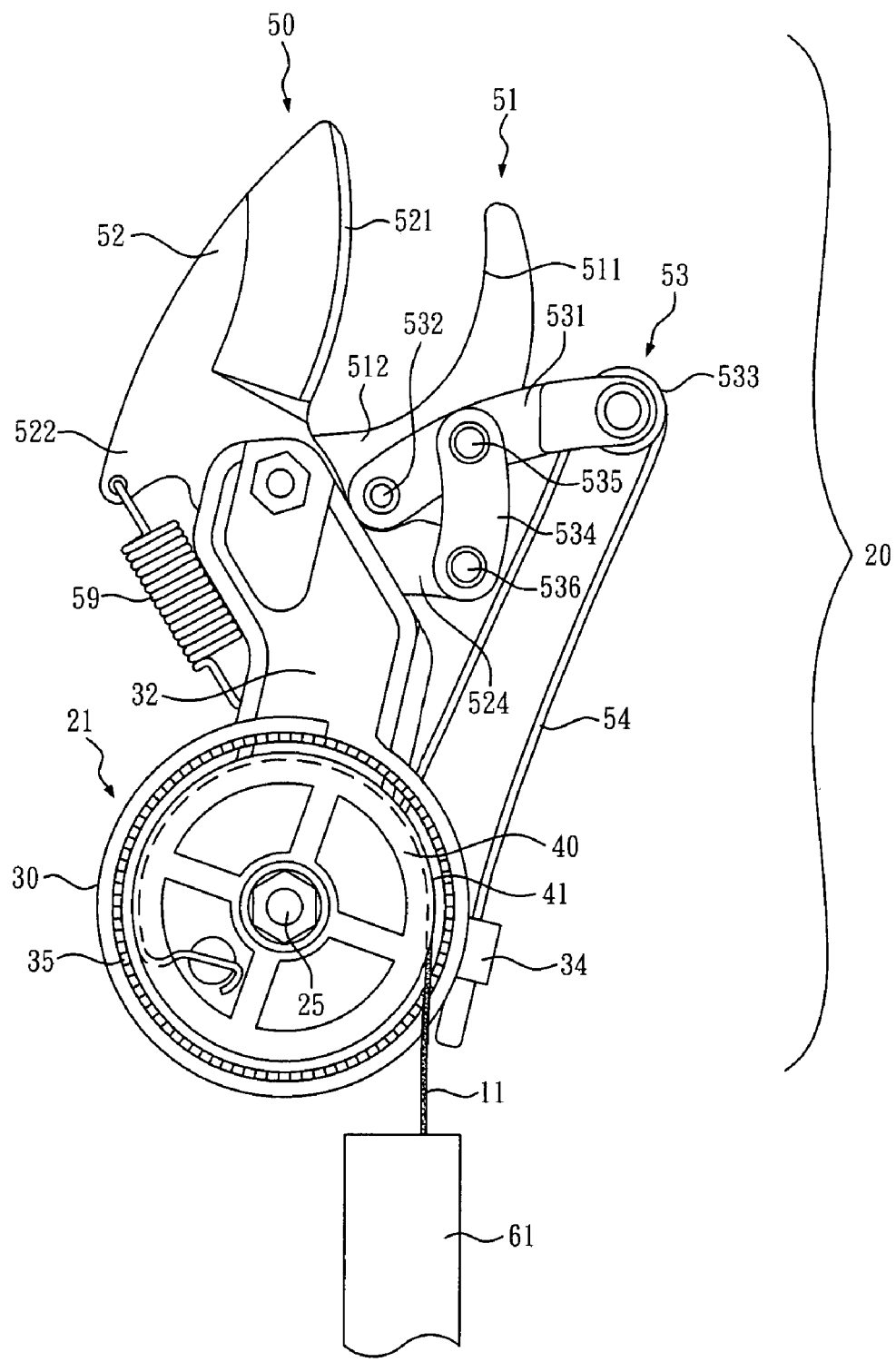
FIG. 5 is a partial schematic cross sectional view with the pruning mechanism sectioned for showing the assembly of the axial wheel and the flexible linking component.
Figure 6:
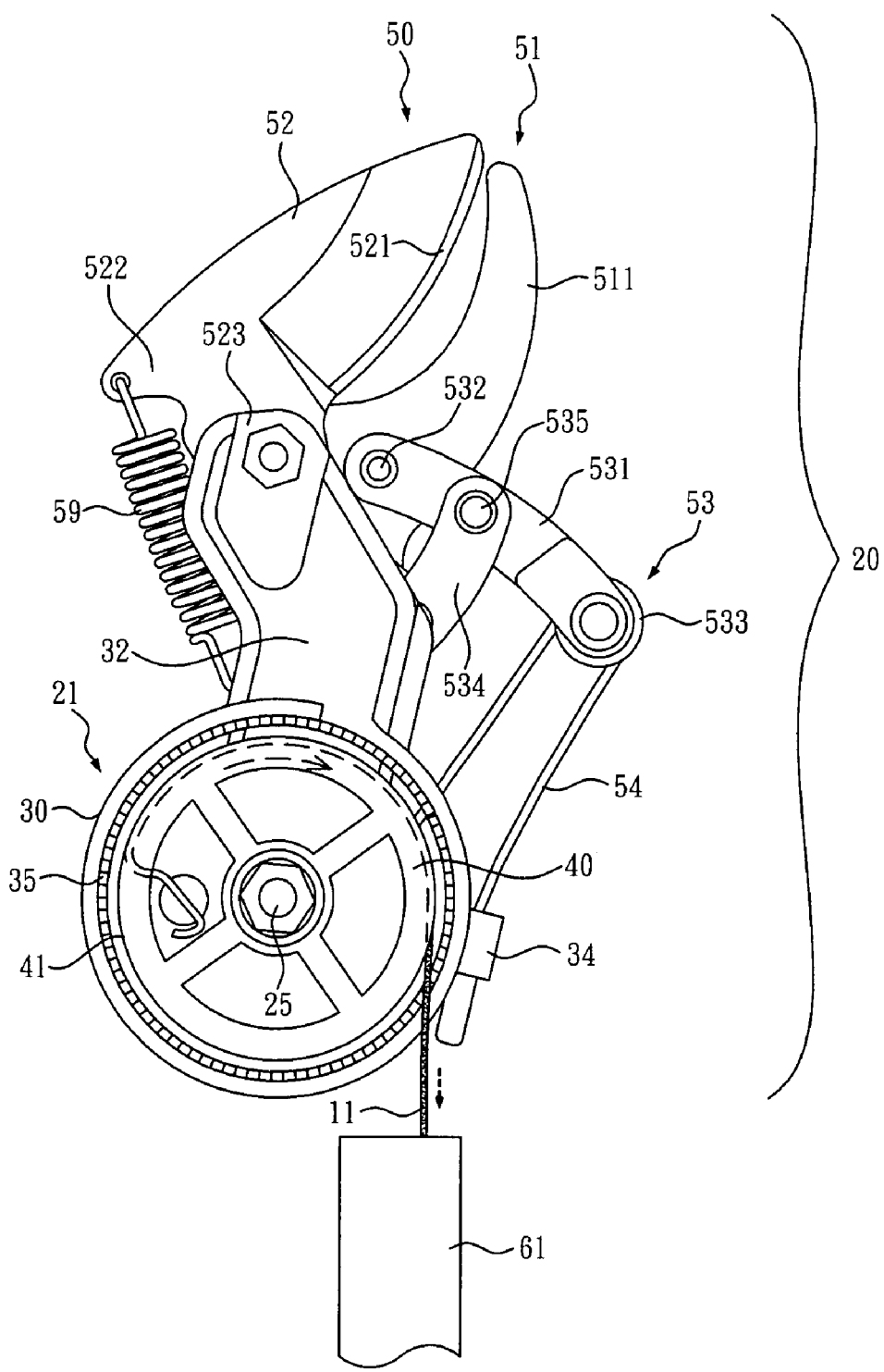
FIG. 6 is another partial schematic cross sectional view with the pruning mechanism sectioned for showing the assembly of the axial wheel and the flexible linking component.

As shown in FIGS. 5 and 6, when the first rope 11 is pulled downward for a predetermined length, the axial wheel 40 is clockwise turned for a predetermined angle. Thus more length of the flexible linking component 54 is reeled in the second reel 42 and a segment of the flexible linking component 54 between the positioning member 34 and the pulley 533 is shortened. When the first link 531 is driven by the flexible linking component 54 to swing downward against the pin 532, the second link 534 and the driving portion 524 of the movable blade 52 are sequentially drawn the blade portion 521 so that the movable blade 52 is rotated about the pin 523 and the movable blade 521 is drawn close the fixed blade 51 to realize a cutting action. On the contrary, when the first rope 11 is released, the returning spring 59 immediately recoils to draw the blade portion 521 of the movable blade 52 away from the block portion 511 and cause all the connected components to move reversely.

Figure 8:
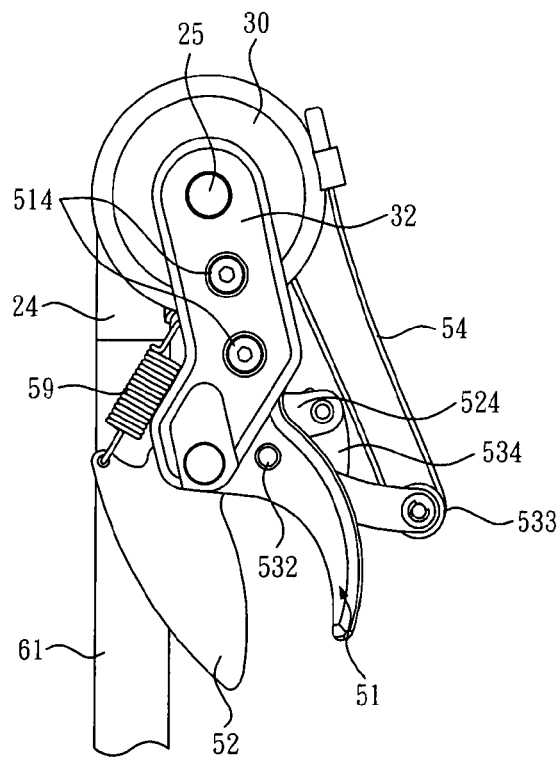
FIG. 8 is a schematic drawing showing the pruning mechanism retracted.
Figure 9:
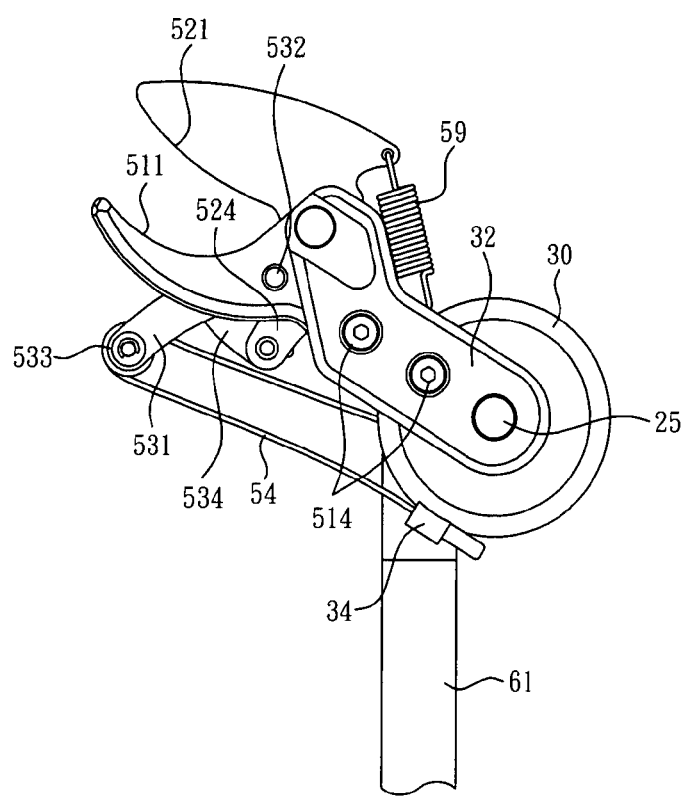
FIG. 9 is a schematic drawing showing the pruning mechanism re-orientated.

In FIGS. 7 and 8, serrations 26, and 35 are formed at facing edges of the fixed portion 22 and the rotatable portion 30, respectively, so that after being fastened by the bolt assembly 25, the fixed portion 22 and the rotatable portion 30 are braked mutually and the rotatable portion 30 and the shears thereon are secured from unintentional rotating. The combination between the fixed portion 22 and the rotatable portion 30 can be tightened or loosened by manually screwing a loosen nut 251 of the bolt assembly 25. When the pruning mechanism 20 is not in use, the nut 251 can be slightly loosened to cause the fixed portion 22 and the rotatable portion 30 to slightly separate such that the rotatable portion 30 can be rotate to turn the fixed blade 51 and the movable blade 52 of the shear assembly 50 to face the slender rod 10 for safe storage that facilitates preventing people from getting hurt by the shears. Referring to FIG. 9, the adjustable bolt assembly 25 as previously described also suggests that the shear assembly 50 of the present invention can be re-oriented to avail a desired operational angle thereof. By conducting the above operation, an angular magnitude between the shear assembly 50 and the slender rod 10 can be adjusted and then fixed.

Figure 10:
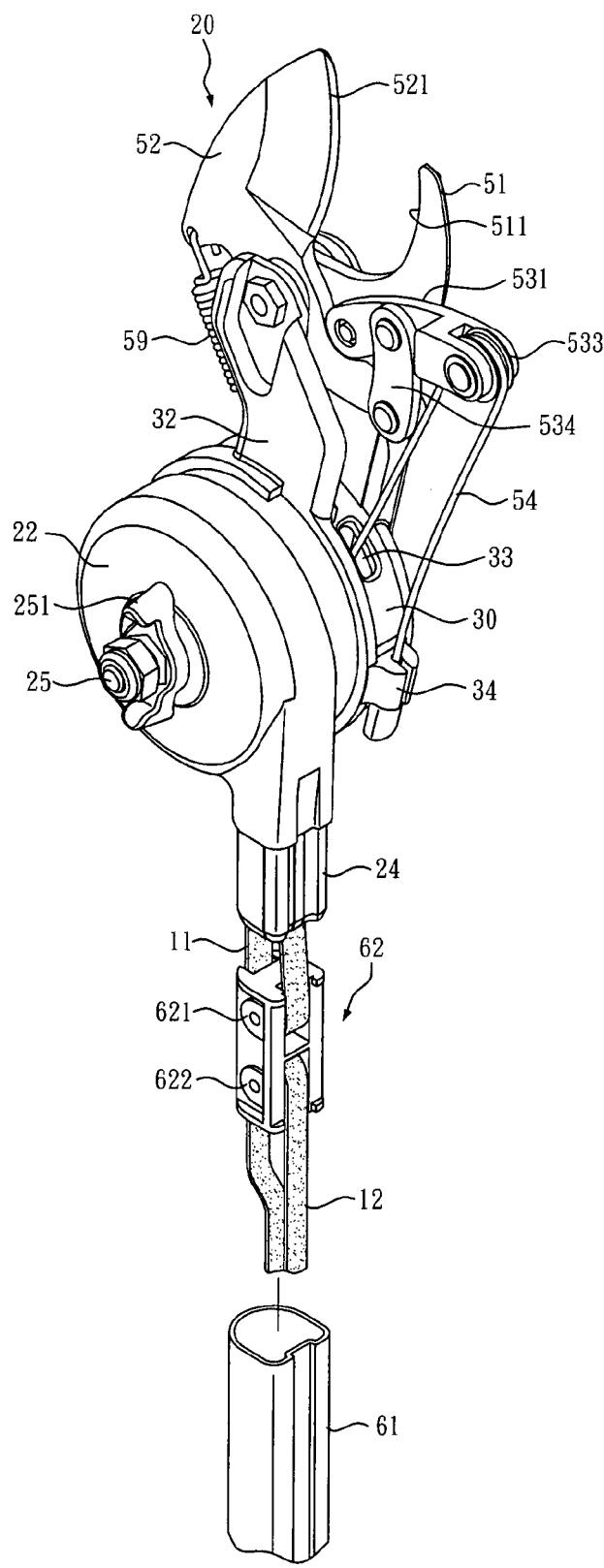
FIG. 10 is an exploded view illustrating the shear assembly, pulley set and top portion of the inner tube.
Figure 11:
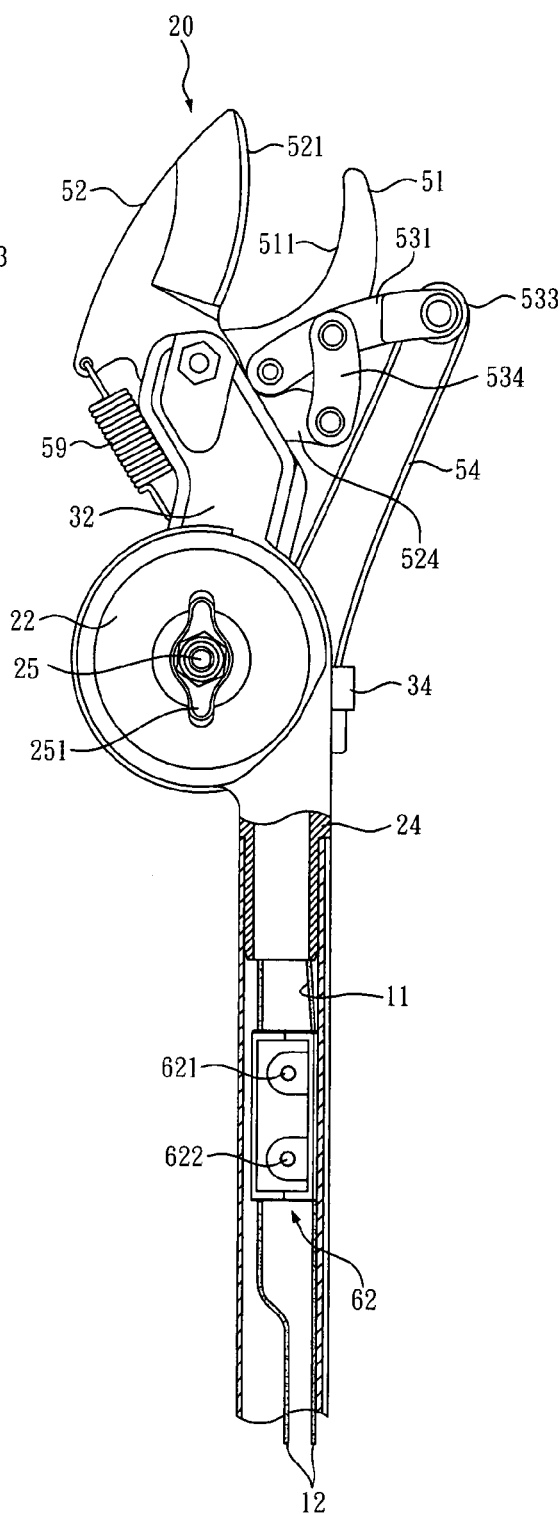
FIG. 11 is a sectional assembly drawing of the components shown in FIG. 10.

In FIGS. 10 and 11, the fixed portion 22 of the shear assembly 50 has the combining portion 24 radially extends outward therefrom to be inserted into the top of the inner tube 61. A pulley set 62 that includes a first pulley 621 and a second pulley 622 may be movably settled in the inner tube 61. The first rope 11 of the shear assembly 50 is wound around the first pulley 621 and has an open end fixed to the combining portion 24.

Figures 12, 13:
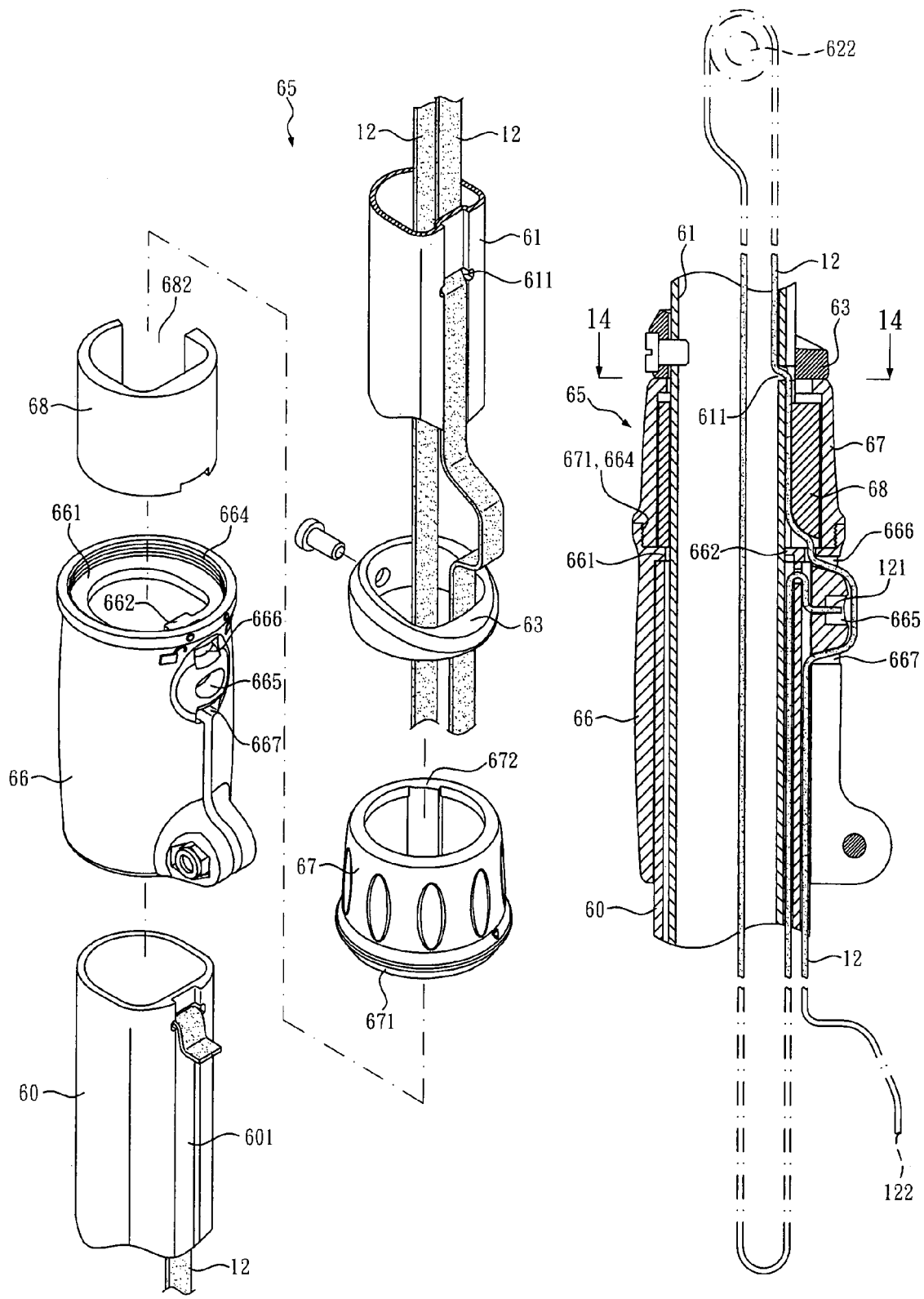
FIG. 12 is an exploded view illustrating the extension-control unit and the peripheral components thereof.
FIG. 13 is a sectional assembly drawing of the components shown in FIG. 12.

Referring to FIGS. 12 and 13, the extension-control unit 65 provided at the border region between the outer and inner tubes 60, 61 is further illustrated. The extension-control unit 65 comprises a fixed member 66, a rotatable member 67 and a C-shaped inner ring 68. The fixed member 66 is fixed outside the top of the outer tube 60 and has an intrusive portion 661 for being retained with the top of the outer tube 60. The C-shaped inner ring 68 is attached on the inner tube 61. The rotatable member 67 is mounted around the C-shaped inner ring 68 and has an externally threaded portion 671 at the bottom thereof combined with an interiorly threaded portion 664 at a top of the fixed member 66. A prominent packing portion 672 is provided at an inner wall of the rotatable member 67 to be positioned in an opening 682 of the C-shaped inner ring 68.

Figure 14:
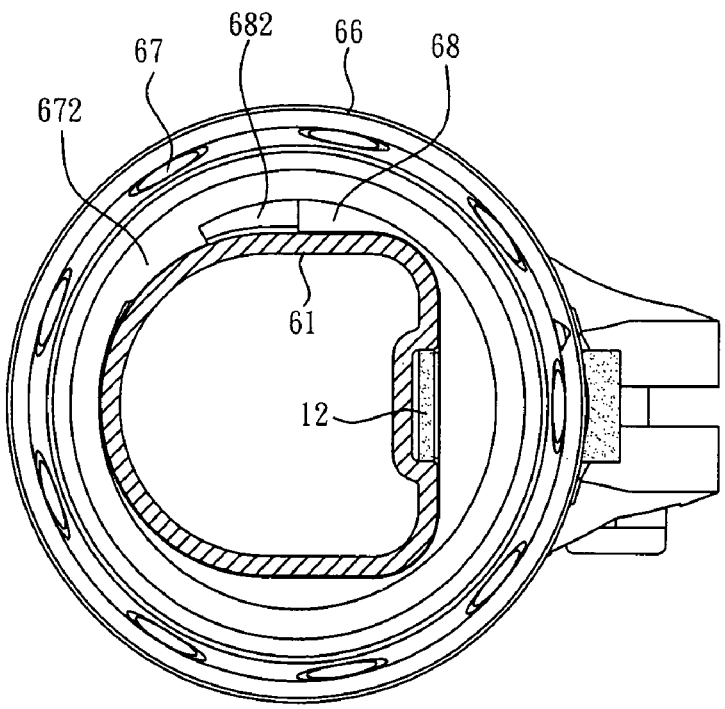
FIG. 14 is a sectional view taken along line 14-14 of FIG. 13 showing the relationship between the extension-control unit and the inner tube.
Figure 15:
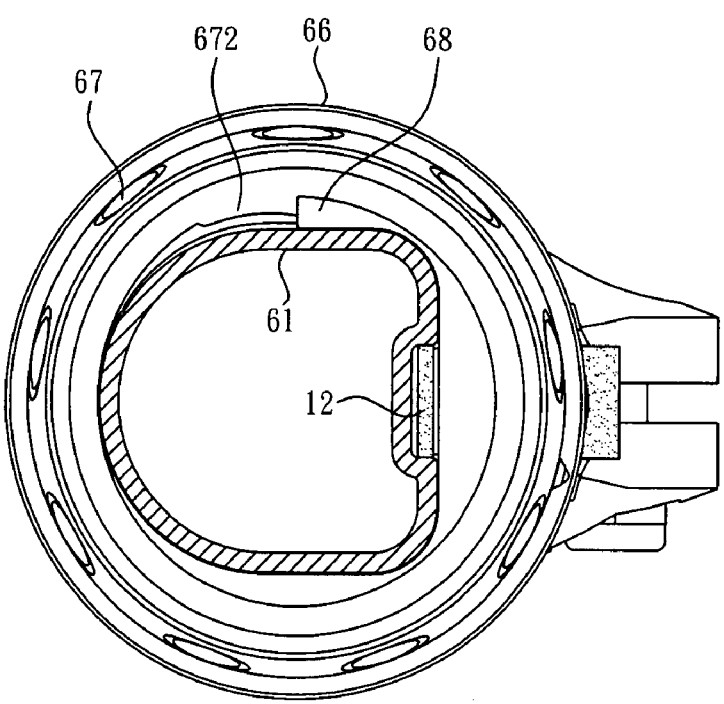
FIG. 15 further illustrates the relationship between the extension-control unit and the inner tube according to the sectional view of FIG. 14.

As shown in FIGS. 14 and 15, while the rotatable member 67 can be rotated, the opening 682 of the C-shaped inner ring 68 substantially limits the displacement of the packing portion 672. Thus, the rotatable angle of the rotatable member 67 is limited. Referring to FIG. 14, when the rotatable member 67 is rotated along one direction, the packing portion 672 abuts against a surface of the inner tube 61, so that the inner tube 61 is retained from shifting along the outer tube 60. On the contrary, in FIG. 15, when the rotatable member 67 is rotated along an opposite direction, the packing portion 672 is drawn apart from the surface of the inner tube 61, so that the inner tube 61 is capable of shifting along the outer tube 60 to change the length it extending beyond the outer tube 60. A first retaining piece 63 is fixed at the surface of the inner tube 61 (as shown in FIGS. 12 and 13).

Figures 16, 17:
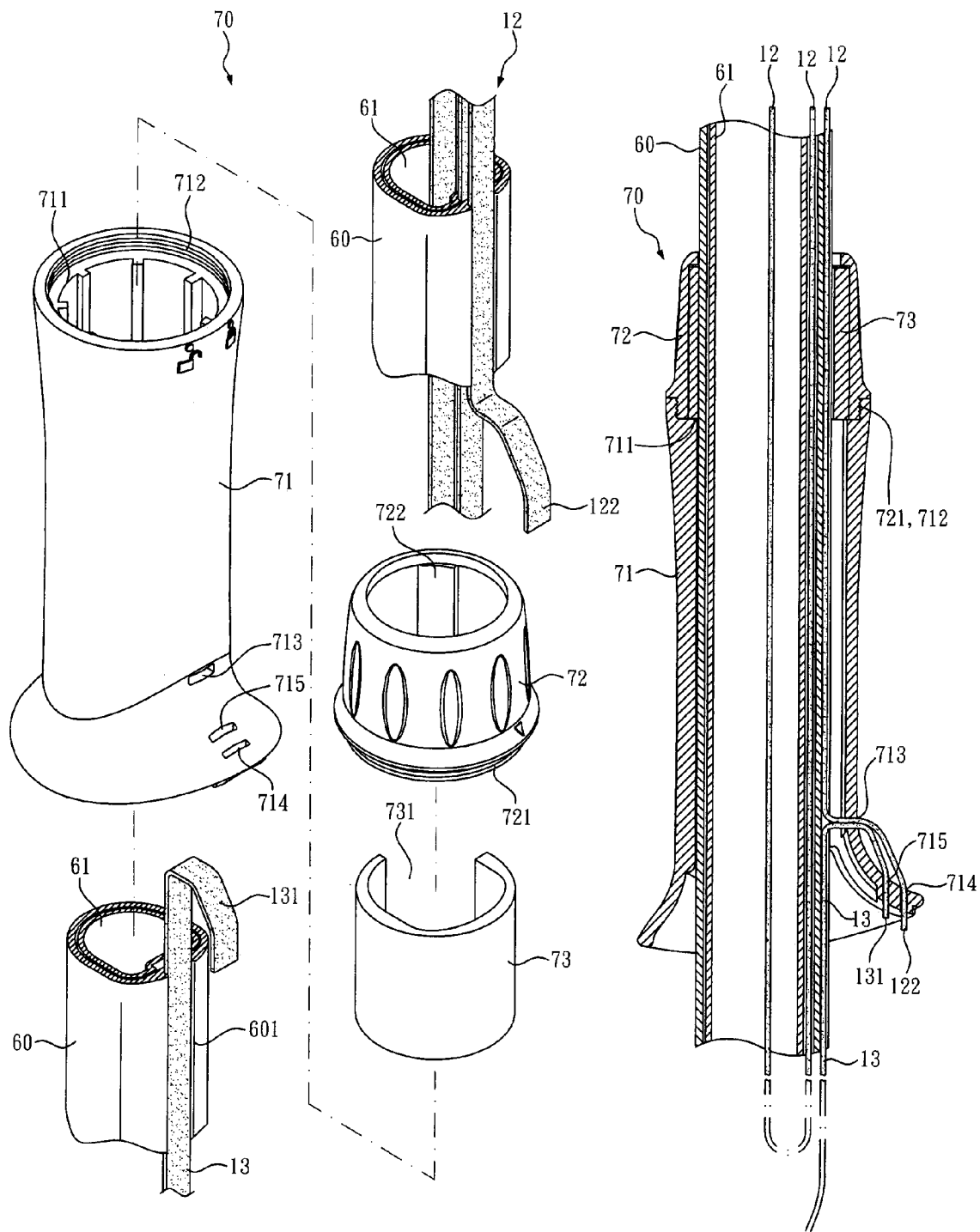
FIG. 16 is an exploded view illustrating the first actuating unit and the peripheral components thereof.
FIG. 17 is a sectional assembly drawing of the components shown in FIG. 16.

Now referring to FIGS. 16 and 17, the first actuating unit 70 comprises a fixed member 71, a rotatable member 72 and a C-shaped inner ring 73. The fixed member 71 sheathes around the outer tube 60 and has an intrusive portion 711 for receiving the C-shaped inner ring 73. The C-shaped inner ring 73 is attached on the outer tube 60. The rotatable member 72 is mounted around the C-shaped inner ring 73 and has an externally threaded portion 721 at the bottom thereof combined with an interiorly threaded portion 712 at a top of the fixed member 71. A prominent packing portion 722 is provided at an inner wall of the rotatable member 72 to be positioned in an opening 731 of the C-shaped inner ring 73. While the rotatable member 72 can be rotated, the opening 731 of the C-shaped inner ring 73 substantially limits the displacement of the packing portion 722. Thus, the rotatable angle of the rotatable member 72 is limited. Therefore, when the rotatable member 72 is rotated along one direction, the packing portion 722 abuts against the surface of the outer tube 60, so that the first actuating unit 70 can be fixed outside the outer tube 60 and can not be pulled any more. On the contrary, when the rotatable member 72 is rotated along an opposite direction, the packing portion 722 is drawn apart from the surface of the outer tube 60, so that the first actuating unit 70 can be pulled to shift along the outer tube 60 to and fro for a predetermined distance.

Figure 18:
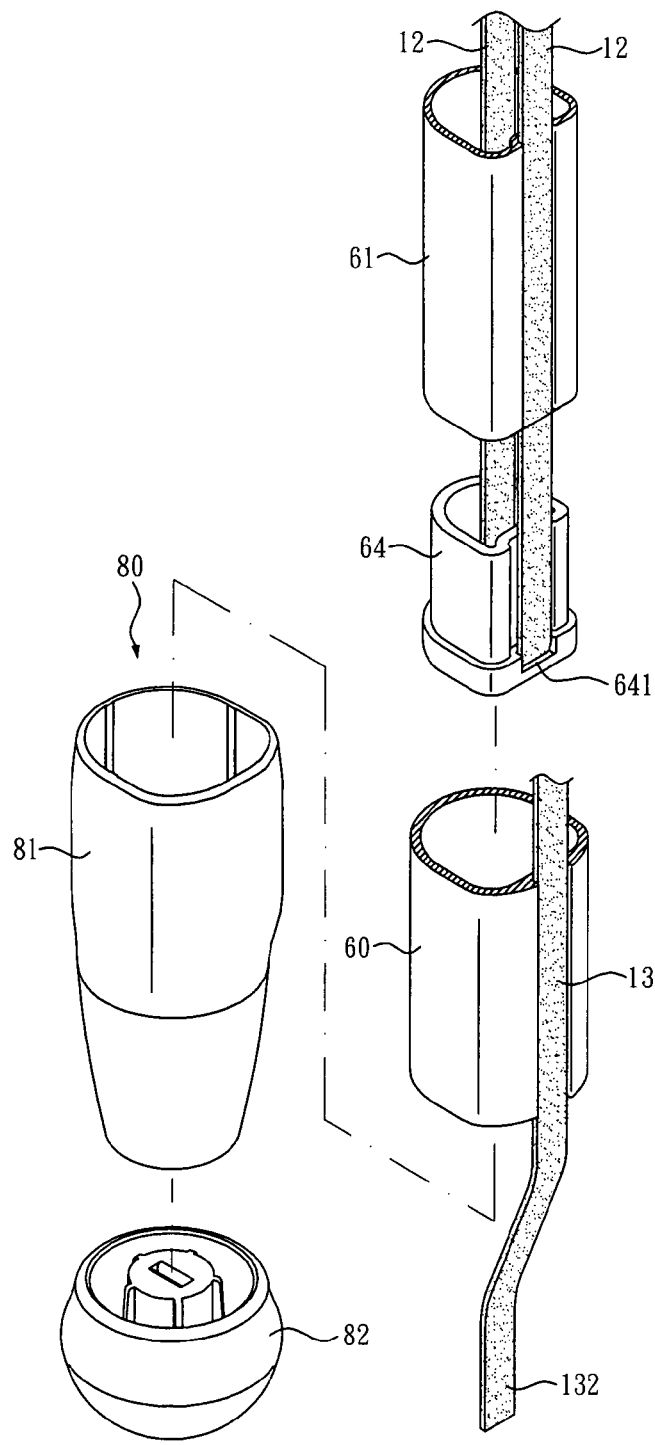
FIG. 18 is an exploded view illustrating the second actuating unit and the peripheral components thereof.
Figure 19:
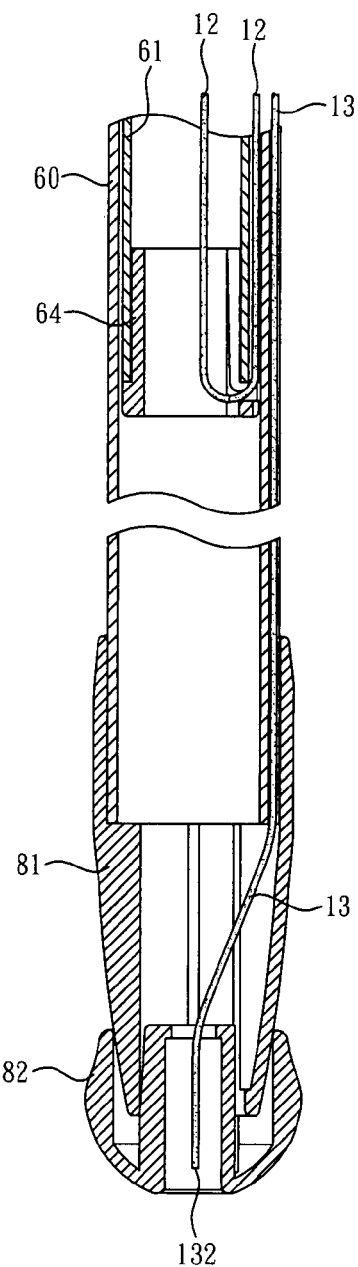
FIG. 19 is a sectional assembly drawing of the components shown in FIG. 18.

Reference is now made to FIGS. 18 and 19. The second actuating unit 80 comprises a fixed member 81 and an actuating member 82. The fixed member 81 is snugly fixed around the bottom of the outer tube 60. The actuating member 82 is coupled with the bottom of the fixed member 81. A second retaining piece 64 is provided at a bottom of the inner tube 61.

According to the embodiment shown in FIGS. 10 through 20, the disclosed lopper further comprises a second rope 12 and a third rope 13. The second rope 12 is wound around the second pulley 622 of the pulley set 62, and then two ends of the second rope 12 extend downward parallelly. The end 121 of the second rope 12 stretches into the inner tube 61; passes around the second retaining piece 64 at the bottom of the inner tube 61; and goes upward along the outer wall of the inner tube 61 to be fixed at a first wall hole 665 of the fixed member 66 of the extension-control unit 65. The other end 122 of the second rope 12 stretches into the inner tube 61 for a predetermined distance; passes through a wall hole 611 of the inner tube 61 and a second wall hole 666 of the fixed member 66 of the extension-control unit 65; turns inward again through a third wall hole 667; goes downward along a groove 601 at the surface of the outer tube 60 to the first actuating unit 70; passes through a first wall hole 713 of the fixed member 71; and is fixed at a second wall hole 714. The third rope 13 is arranged along the groove 601 at the surface of the outer tube 60. One end 131 of the third rope 13 passes through the first wall hole 713 of the fixed member 71 of the first actuating unit 70 and is fixed at a third wall hole 715. An opposite end 132 of the third rope 13 is fixed at the actuating member 82 of the second actuating unit 80.

Hereinafter, referring to FIGS. 21 and 22, actions and effects of the second and third ropes 12, 13 under operating the first and second actuating units 70, 80 are illustrated.

Figure 21:
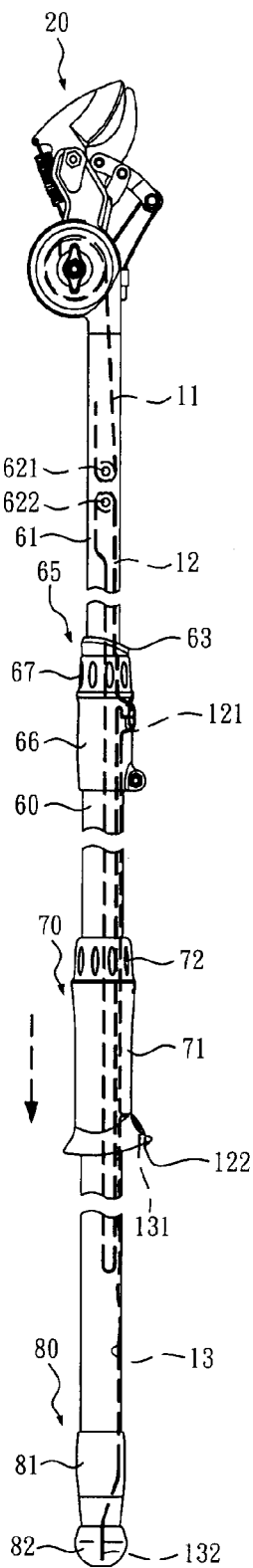
FIG. 21 is another plane view of the disclosed subject matter showing the first actuating unit pulled downward.

In FIG. 21, when the first actuating unit 70 is pulled downward, the end 122 of the second rope 12 moves downward. At this time, since the other end 121 is fixed at the extension-control unit 65, the second rope 12 pulled downward in turn draws the pulley set 62 downward so that the first pulley 621 pulls the first rope 11 downward to rotate the axial wheel 40 of the pruning mechanism 20 and consequently close the shear assembly 50. Meanwhile, when the first actuating unit 70 is pulled downward, the end 131 of the third rope 13 is also pulled downward and the third rope 13 is bent.

When the first actuating unit 70 is released from the state shown in FIG. 21, the returning spring 59 causes the shear assembly 50 opened, and the axial wheel 40, the first rope 11, the pulley set 62, the second rope 12 in turn move reversely so the actuating unit 70 rises and returns to the initial position thereof.

Figure 22:
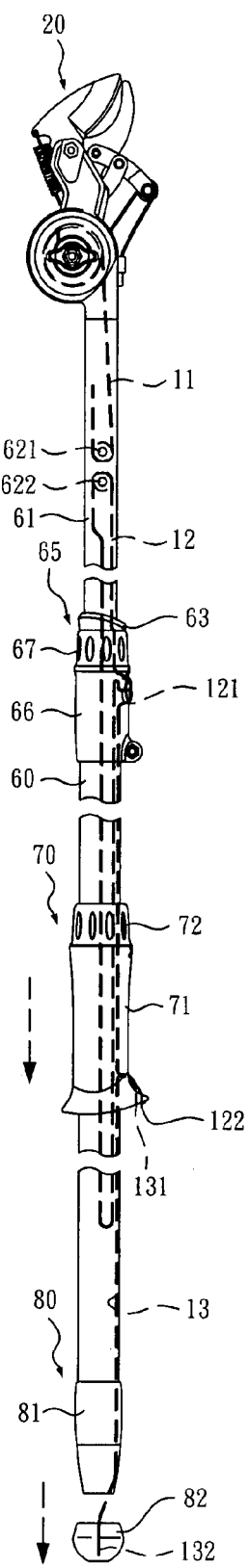
FIG. 22 is another plane view of the disclosed subject matter showing the second actuating unit pulled downward.

According to FIG. 22, when the actuating member 82 of the second actuating unit 80 is pulled downward, the third rope 13 draws the first actuating unit 70 downward to perform the same actions as shown in FIG. 21 so that the shear assembly 50 can be also closed in this way. On the contrary, when the actuating member 82 is released, the returning spring 59 causes the shear assembly 50 opened, and the axial wheel 40, the first rope 11, the pulley set 62, the second rope 12 in turn move reversely so the actuating member 82 returns to the initial position thereof.

Thereupon, a user can implement either the first actuating unit 70 or the second actuating unit 80 to operate the shear assembly 50 according to his/her operational convenience.

Figure 20:
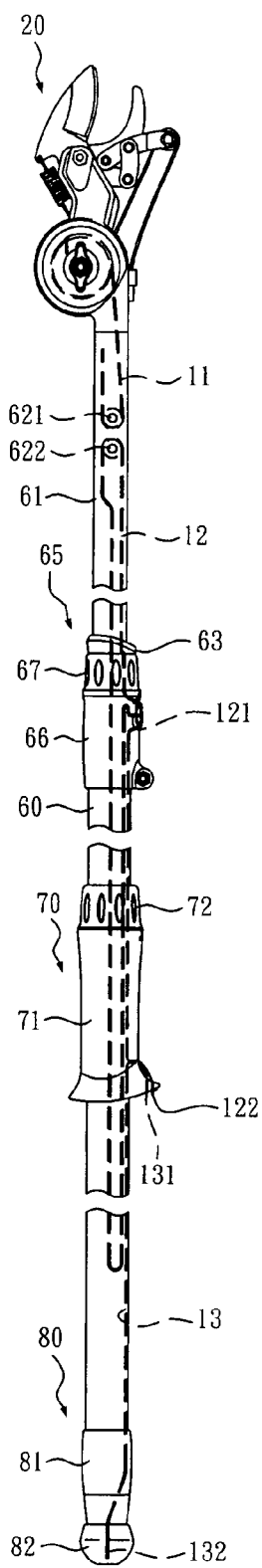
FIG. 20 is a plane view of the disclosed subject matter.
Figure 23:
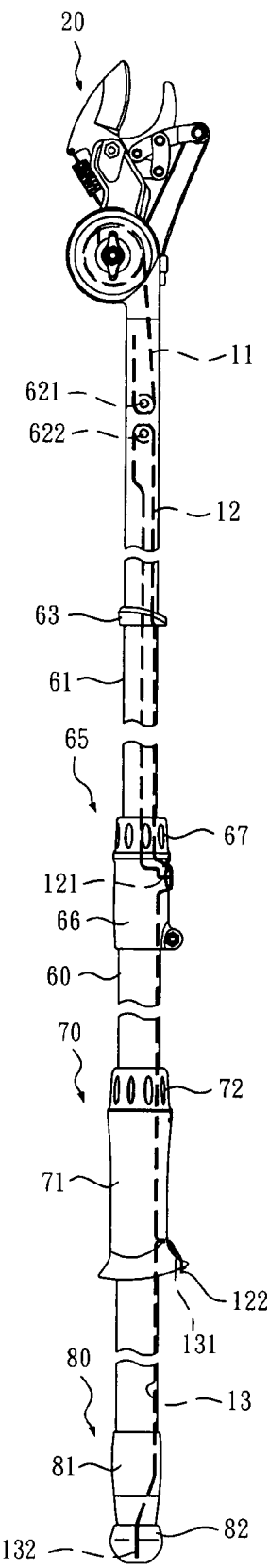
FIG. 23 is another plane view of the disclosed subject matter showing the inner tube pulled out for extending the length of the slender rod.

In FIGS. 20 and 23, the extension of the inner tube 61 is illustrated. As shown in FIG. 20, the first retaining piece 63 attached to the inner tube 61 has reaches the rotatable member 67 of the extension-control unit 65 and the inner tube 61 can not move down any more. Therefore a basic length of the slender rod 10 is composed of a total length of the outer tube 60 and a length of a segment of the inner tube 61 currently jutting out from the outer tube 60. In FIG. 23, the inner tube 61 is extremely pulled out from the outer tube 60. Thus, a maximum length of the slender rod 10 is composed of a total length of the outer tube 60 and a length of a segment of the inner tube 61 currently jutting out from the outer tube 60. In spite of the length of the segment of the inner tube 61 currently jutting out from the outer tube 60, the second rope 12 can accommodate itself thereto, so that the shear assembly 50 can be always controlled by the first and second actuating units 70, 80.

Figure 24:
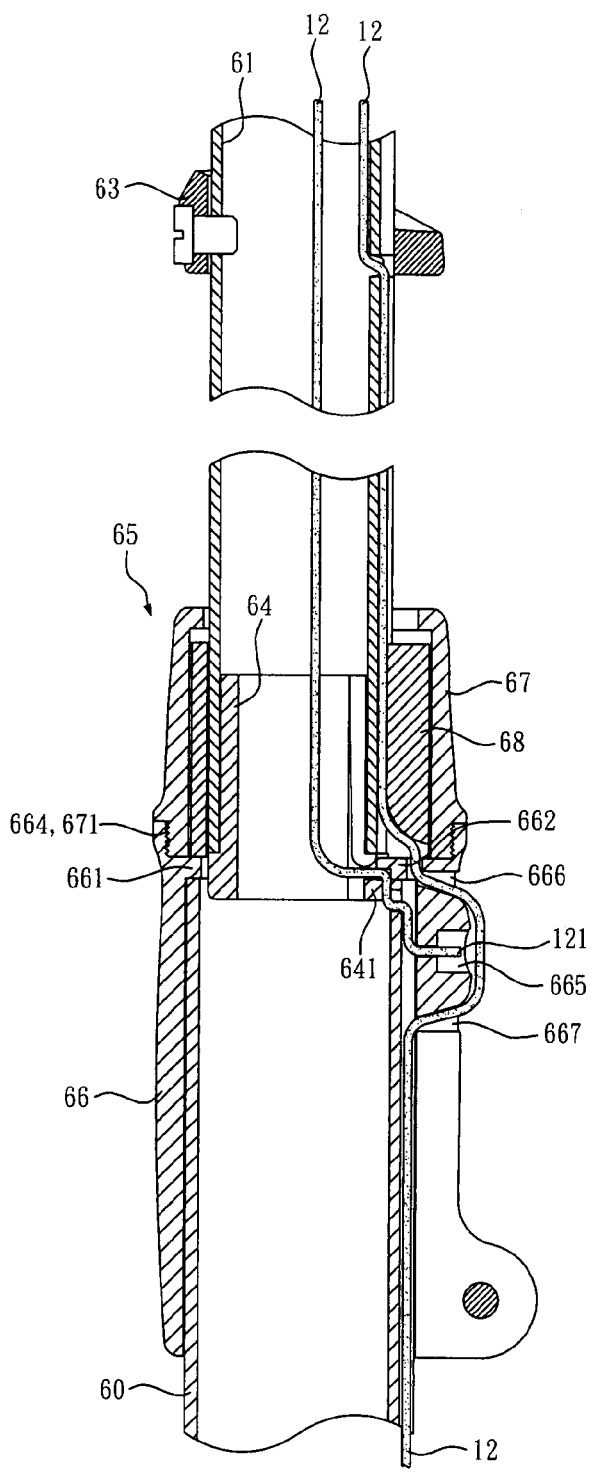
FIG. 24 is a sectional view showing the bottom of the inner tube retained at the extension-control unit.

In FIG. 18, the second retaining piece 64 of the inner tube 61 provides a retaining recess 641 while the intrusive portion 661 of the fixed member 66 of the extension-control unit 65 provides a retaining protrusion 662 as shown in FIG. 12. Thus, as can be seen in FIG. 24, when the inner tube 61 is extremely pulled out from the outer tube 60, the retaining recess 641 of the second retaining piece 64 is coupled with the retaining protrusion 662 of the extension-control unit 65 so that the inner tube can be secured and free from leaving the outer tube 60.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A lopper, comprising:
   a slender rod;
   a pulley set, provided inside the slender rod;
   a drum, mounted at a top of the slender rod;
   an axial wheel, rotatably deposited in the drum;
   a first rope, wound around the axial wheel and a first pulley of the pulley set;
   a fixed blade, fixed outside the drum;
   a movable blade, having one end formed as a blade portion, an opposite end formed as a driving portion, and an intermediate pivot portion, wherein the movable blade is connected to one end of the fixed blade at the pivot portion, and is swingable against where the movable blade and fixed blade are connected;
   a linkage, connected to the fixed blade and the driving portion of the movable blade and equipped with a pulley thereon;
   a flexible linking component, wound around the pulley of the linkage and having a first end thereof fixed at the axial wheel while a second end end is fixed to a positioning member deposited outside of the drum; and
   a return spring, connected between the movable blade and the drum and exerting a resilience thereof upon the movable blade so as to separate the blade portion of the movable blade from the fixed blade.

2. The lopper of claim 1, wherein the axial wheel includes a first reel and a second reel configured coaxially in which a diameter of the first reel is greater than a diameter of the second reel and one end of the first rope is fixed to the first wheel while the first end of the flexible linking component is fixed to the second reel.

3. The lopper of claim 1, wherein the linkage is a two-piece linkage in which a first link thereof has one end rotatably fastened to the fixed blade by a pin while an opposite end equipped with the pulley and a second link thereof has one end rotatably fastened to the first link by a pin while an opposite end rotatably fastened to the driving portion of the movable blade by a pin.

4. The lopper of claim 1, wherein the drum is constructed from combining a fixed portion and a rotatable portion face to face so that the axial wheel can be accommodated therein in which the fixed portion is fixed to the top of the slender rod; the fixed blade is fixed outside the rotatable portion; the positioning member for receiving the second end of the flexible linking component is deposited outside the rotatable portion; and the returning spring is connected between the movable blade and the rotatable portion.

5. The lopper of claim 4, wherein serrations are formed at facing edges of the fixed portion and the rotatable portion, respectively.

6. The lopper of claim 5, wherein a manual-loosened bolt assembly passes through the fixed portion, the rotatable portion, and a center of the axial wheel.

7. The lopper of claim 1, wherein the slender rod includes an outer tube, an inner tube movably telescoped in and shiftable along the outer tube, an extension-control unit provided at a border region between the outer and inner tubes, and a first actuating unit deposited at a body of the outer tube in which the pulley set is settled movably in the inner tube and further comprises a second pulley.

8. The lopper of claim 7, further comprising a second rope wound around the second pulley of the pulley set wherein two ends of the second rope extend downward parallelly in the manner that the first of said two ends stretches into the inner tube; passes around a bottom of the inner tube and goes upward along an outer wall of the inner tube to be fixed at the extension-control unit while the second of said two ends stretches into the inner tube for a predetermined distance; pierces out from the inner tube; and goes downward along a groove at an outer surface of the outer tube to be fixed at the first actuating unit.

9. The lopper of claim 8, wherein the extension-control unit comprises a fixed member and a rotatable member in which the fixed member is fixed outside a top of the outer tube while the rotatable member is rotatably connected with the fixed member and snugly sheathes the outer wall the inner tube, wherein a prominent packing portion is provided on an inner wall of the rotatable member so that when the rotatable member is rotated along one direction for a predetermined angle, the packing portion abuts against an outer surface of the inner tube.

10. The lopper of claim 9, further comprising a C-shaped inner ring fixed at a top of the fixed member and positioned inside the rotatable member, wherein the inner tube pierces through the C-shaped inner ring and the packing portion is aligned to an opening of the C-shaped inner ring.

11. The lopper of claim 8, wherein the first actuating unit comprises a fixed member and a rotatable member in which the fixed member is fixed around the outer tube and the rotatable member is rotatably connected with the fixed member and snugly sheathes an outer wall of the outer tube, wherein a prominent packing portion is provided on an inner wall of the rotatable member so that when the rotatable member is rotated along one direction for a predetermined angle, the packing portion abuts against the outer surface of the outer tube, and the second end of said two ends of the second rope is fixed at the fixed member of the first actuating unit.

12. The lopper of claim 11, further comprising a C-shaped inner ring fixed at a top of the fixed member and positioned inside the rotatable member so as to snugly sheathe around the outer surface of the outer tube, wherein the packing portion is aligned to an opening of the C-shaped inner ring.

13. The lopper of claim 8, further comprising a second actuating unit deposited at a bottom of the outer tube.

14. The lopper of claim 13, further comprising a third rope, wherein the third rope is arranged along the outer surface of the outer tube in which a first end of the third rope is fixed at the first actuating unit and a second opposite end of the third rope is fixed at the second actuating unit.

15. The lopper of claim 14, wherein the second actuating unit comprises a fixed member and an actuating member in which the fixed member is snugly fixed around the bottom of the outer tube and the actuating member is coupled with the bottom of the fixed member and the second end of the third rope is fixed to the actuating member.

16. The lopper of claim 7, wherein a first retaining piece is fixed at an outer surface of the inner tube to prevent a portion of the inner tube from traveling through the extension-control unit, and a second retaining piece is provided at a bottom of the inner tube.

17. The lopper of claim 16, wherein the second retaining piece comprises a retaining recess and the extension-control unit comprises a retaining protrusion such that the retaining protrusion is used to retain the retaining recess.

* * * * *